United States Patent [19]

Krause

[11] 4,195,198
[45] Mar. 25, 1980

[54] BUSWAY GROUND BUS JOINT

[75] Inventor: Werner A. Krause, Plantsville, Conn.

[73] Assignee: General Electric Company, New York, N.Y.

[21] Appl. No.: 1,561

[22] Filed: Jan. 8, 1979

[51] Int. Cl.² .............................................. H02G 5/06
[52] U.S. Cl. ................................ 174/94 S; 174/68 B; 174/99 B; 339/14 R; 339/22 B
[58] Field of Search ...................... 174/68 B, 70 B, 78, 174/84 S, 88 B, 88 S, 94 S, 99 B; 339/14 R, 14 L, 22 B; 361/378

[56] References Cited

U.S. PATENT DOCUMENTS

| | | |
|---|---|---|
| 3,015,082 | 12/1961 | Meacham ........................... 339/22 B |
| 3,124,642 | 3/1964 | Meacham ............................ 174/88 B |
| 4,082,393 | 4/1978 | Gamble .............................. 339/14 R |
| 4,085,988 | 4/1978 | Gamble .............................. 339/14 R |

*Primary Examiner*—Laramie E. Askin
*Attorney, Agent, or Firm*—Robert A. Cahill; Walter C. Bernkopf; Philip L. Schlamp

[57] ABSTRACT

Separate conductive foils, riveted in electrical connection to each end of the ground bus in a busway section, are wrapped over the flange of the busway section housing. Upon joining two busway sections end-to-end, the foils of adjacent ground bus ends are sandwiched between the lapped flanges of adjacent busway sections. The ground bus joint is perfected by bolts clamping the lapped flanges together.

6 Claims, 5 Drawing Figures

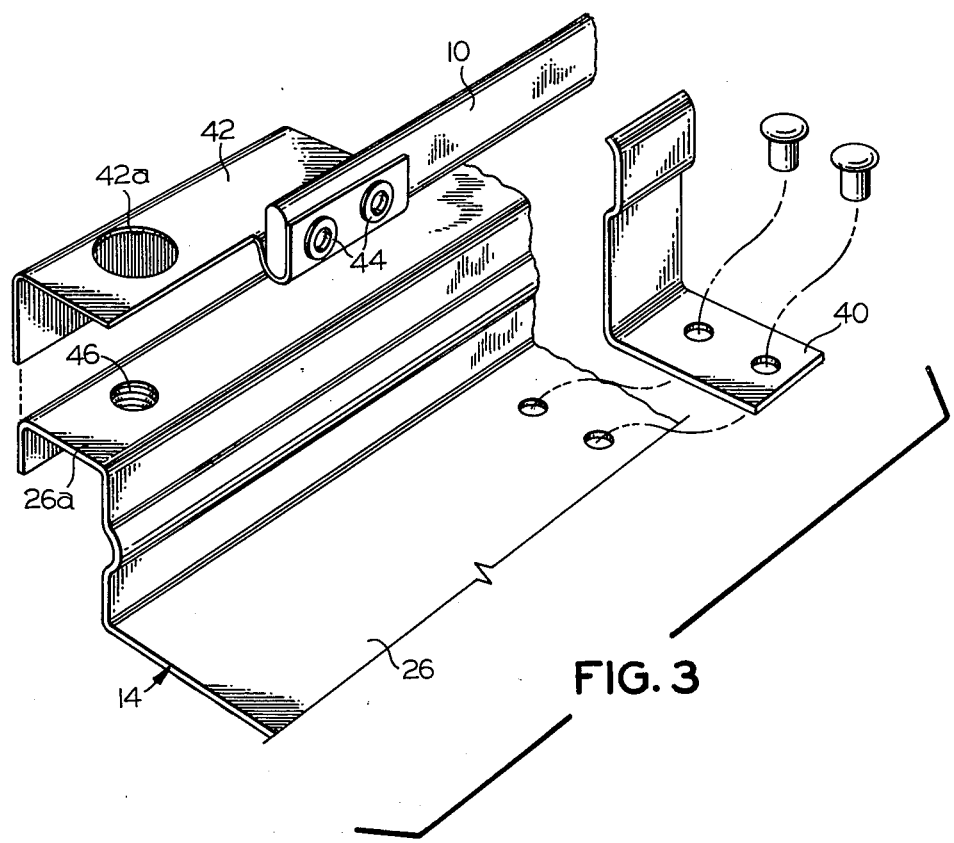
FIG. 3
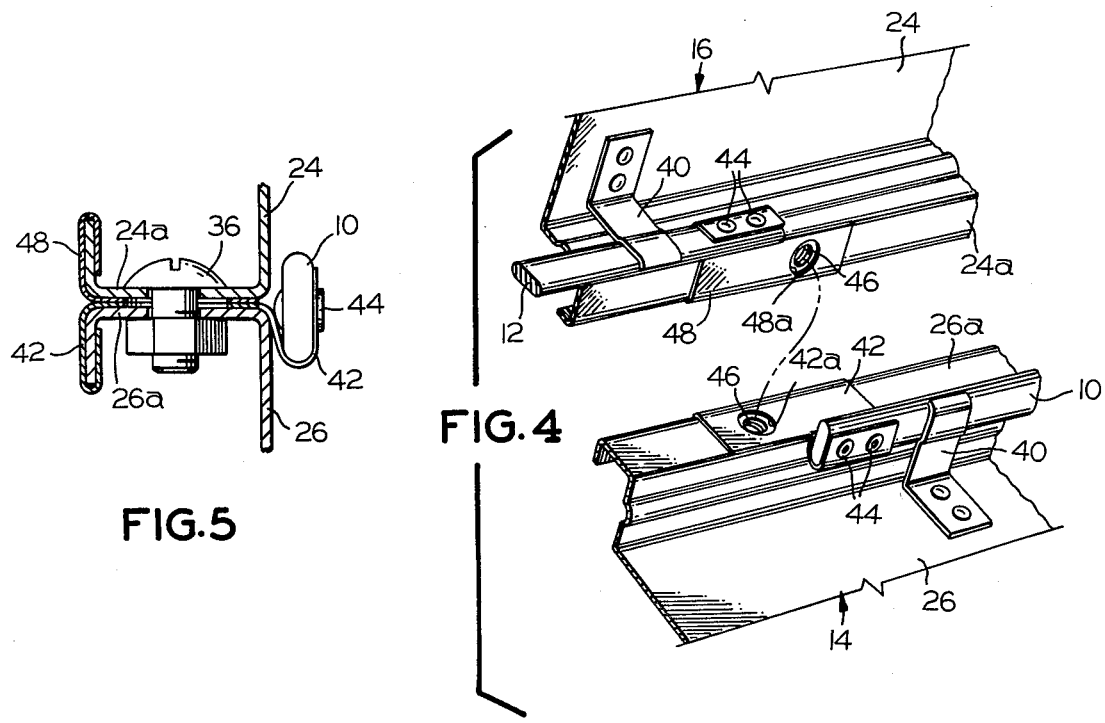
FIG. 4
FIG. 5

BUSWAY GROUND BUS JOINT

BACKGROUND OF THE INVENTION

Until recently, the ground circuit path for an industrial electrical power distribution system was provided by the steel busway housing. With the increased emphasis toward ground fault protection for the loads fed by the distribution system, the need for a ground circuit path of greater reliability than the busway housing became apparent. To this end, manufacturers have resorted to including an additional busbar in their busway to accommodate the ground circuit path. The inclusion of a separate ground bus renders electrical grounding connections at the source and the various loads more convenient and reliable. It thus remains, in order to achieve overall ground circuit continuity, to provide for a reliable electrical joint between the ground bus of the busway sections making up the distribution system.

It is accordingly an object of the present invention to provide an improved electrical joint between ground bus of adjacent busway sections.

An additional object is to provide a ground bus joint of the above character which is convenient to perfect.

Another object of the present invention is to provide a ground bus joint of the above character which is simple in construction, inexpensive to manufacture, and reliable in use.

Other objects of the invention will in part be obvious and in part appear hereinafter.

SUMMARY OF THE INVENTION

In accordance with the present invention, there is provided busway sections having, in addition to plural, elongated phase busbars and for certain applications an elongated neutral busbar, an elongated ground busbar positioned adjacent one sidewall of the busway section housing. On each terminal end portion of the ground bus of each busway section is wrapped an end portion of separate conductive foils. Fasteners secure these foils in electrical connection with the ground bus ends. The other end portions of the foils are wrapped over a laterally extending flange of the busway section housing. Upon joining two busway sections end-to-end, the foils electrically connected to the adjacent ends of the ground bus in the two busway sections are sandwiched between the lapped flanges of the two section housings. Bolts clamping the lapped flanges together press the foils into intimate electrical contacting interengagement to achieve a reliable electrical joint between the ground bus of the two busway sections.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 3 is an exploded, fragmentary perspective view of one half of the ground bus joint of FIG. 1;

FIG. 4 is a perspective assembly view of the ground bus joint of FIG. 1; and

FIG. 5 is a sectional view taken along line 5—5 of FIG. 1.

Like reference numerals refer to corresponding parts throughout the several views of the drawings.

DETAILED DESCRIPTION

Figure 1:
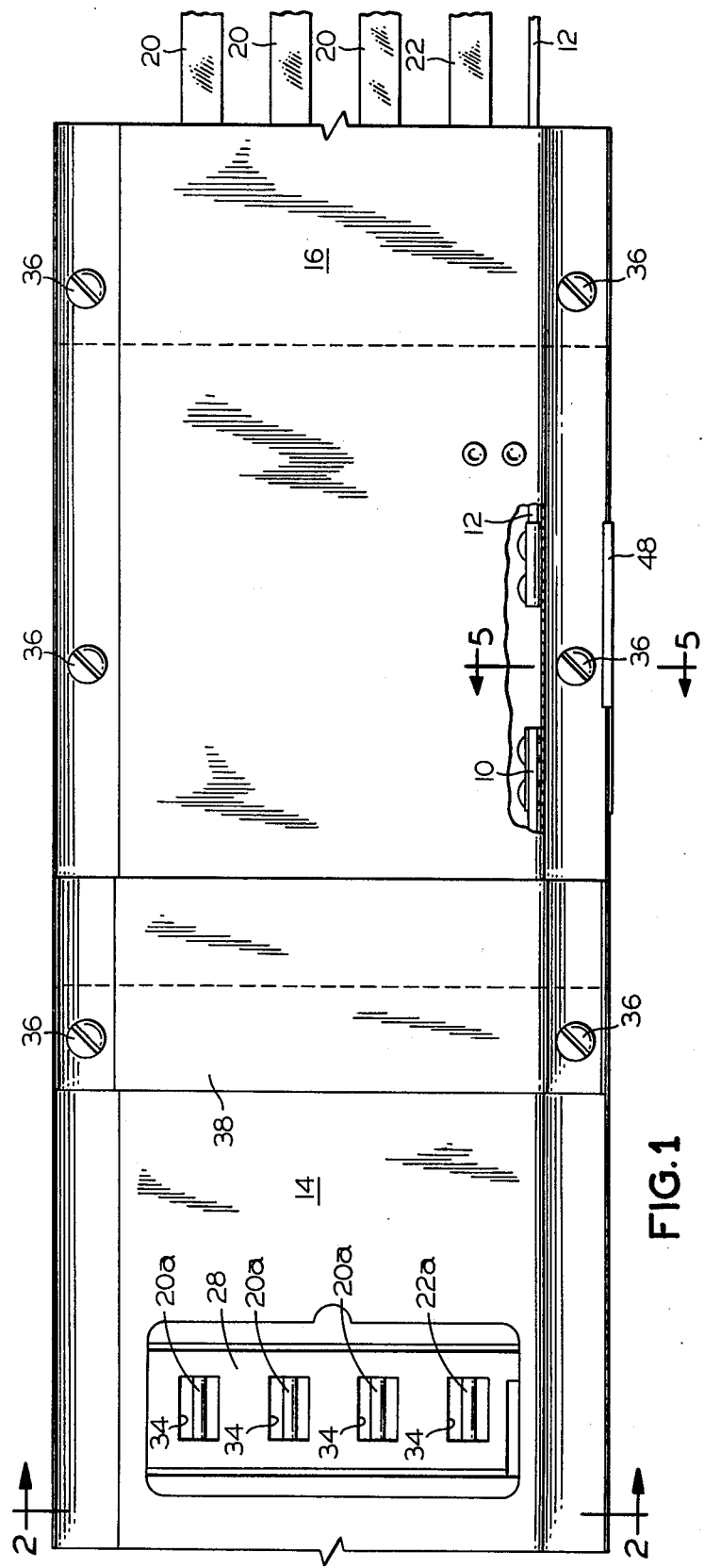
FIG. 1 is a plan view, partially broken away, of a joint between busway sections incorporating the present invention.

The ground bus joint of the present invention is utilized to electrically interconnect ground busbars 10 and 12 incorporated in two busway sections, generally indicated at 14 and 16, which are physically and electrically joined end-to-end as seen in FIG. 1. Each busway section includes a plurality of elongated phase busbars 20 and, in the illustrated embodiment, a neutral busbar 22 enclosed in a housing consisting of top and bottom, channel-shaped covers 24 and 26, best seen in FIG. 2. The lateral edges of these covers are bent out and then back to provide coextensive, L-shaped flanges 24a and 26a which are clamped together along their lengths to join the covers in creating a busway section housing. The busbars 20 and 22 are positioned in spaced, insulated relation across the width of their busway section in edge-to-edge relation to minimize the force interaction under a short circuit condition. For the purpose of facilitating busbar engagement by the resilient jaws of a bus plug (not shown) plugged into a plug outlet 28, seen in FIG. 1, the busbars 20, 22 are formed with momentary 90 degree twisted segments, indicated at 20a and 22a in FIGS. 1 and 2. To support the busbars within their busway section housings, plug outlet 28 is comprised of a pair of molded insulators 30 and 32, respectively received in close fitting relation by covers 24 and 26 and complementarily notched to in turn receive the twisted segments 20a, 22a of the busbars. The insulators are suitably apertured, as indicated at 34 in FIG. 1 to provide access to the twisted busbar segments for the bus plug jaws. Reference may be had to U.S. Pat. Nos. 3,015,082 and 3,124,642 for a more detailed description of this general construction. To accommodate joining busway sections 14 and 16 end-to-end, the top cover 24 of section 14 is cut back, while the bottom cover 26 of section 16 is correspondingly cut back. The ends of the busbars 20, 22 are thus exposed at the ends of the busway sections 14, 16 to be joined. In perfecting the busway joint, the overhanging portion of bottom cover 26 of busway section 14 and the overhanging portion of top cover 24 of busway section 16 are overlapped and secured together along their mating flanges 24a and 26a by bolts 36. In the process, the terminal portions of the respective busbars 20, 22 of the two busway sections are lapped and pressed into electrical contacting interengagement in the manner taught in the above-noted U.S. Pat. No. 3,124,642. Top and bottom splice plates, one seen at 38, are secured to the terminations of the overhanging covers to conceal the seams between the corresponding busway section covers.

Figure 2:
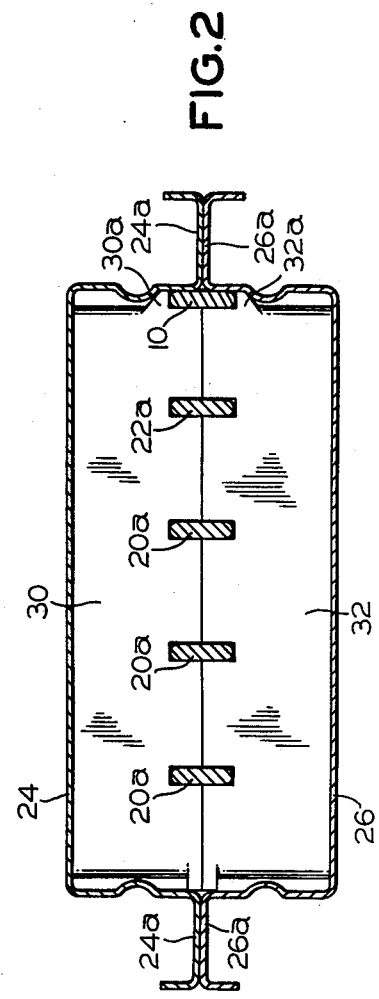
FIG. 2 is a sectional view taken along line 2—2 of FIG. 1.

As best seen in FIG. 2, the ground busbars 10 and 12 are supported in their respective busway sections 14 and 16 between flanges 30a and 32a integrally formed with insulators 30 and 32, respectively, and the sidewalls of housing covers 24 and 26. Additional support for the ground busbars is provided by brackets 40 riveted to the housing covers, as seen in FIGS. 3 and 4. A conductive metal foil 42 of, for example, copper is wrapped partially around the termination of ground busbar 10 of busway section 14 and secured in electrical connection therewith by rivets 44. The remainder of this foil is wrapped over flange 26a of the overhanging portion of housing cover 26 for busway section 14. A hole 42a is formed in foil 42 in registry with a bolt hole 46 in flange 26a. In the same manner, a foil 48 is wrapped on the termination of ground busbar 12, secured in electrical connection therewith by rivets 44, and wrapped over flange 24a of the overhanging portion of housing cover 24 for busway section 16. A hole 48a is formed in foil 48 in registry with a bolt hole 46 in flange 24a.

With this construction, it is seen that upon joining the busway sections 14 and 16 end-to-end, the foils 42 and 48 are disposed in electrical contacting engagement, sandwiched between flanges 24a and 26a of housing covers 24 and 26, as best seen in FIG. 5. One of the joint securing bolts 36 is received through the registered bolt holes 46 in the lapped flanges 24a, 26a to clamp the foils 42, 48 in secure electrical interconnection. A twenty mil copper foil has been found eminently suitable for use in the present invention.

From the foregoing description, it is seen that the present invention provides a reliable ground busbar joint between busbar sections which is perfected in an efficient manner incident to the perfection of the electrical joints between phase and neutral busbars and the physical joining of two busway sections end-to-end.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An electrical joint between first and second ground busbars of two busway sections joined end-to-end, wherein each busway section includes a housing consisting of top and bottom covers secured together along coextensive, lapped, laterally extending top and bottom cover flanges, and wherein at the joined ends of adjacent busway sections, the top cover overhangs the bottom cover of one busway section and the bottom cover overhangs the top cover of the other busway section such that the overhang portions of the top and bottom covers assume a lapped relation upon joining the two busway sections end-to-end, said ground busbar electrical joint comprising, A. a first electrically conductive foil having a first portion wrapped in electrical connection with a termination of said first ground busbar and a second portion wrapped over the lateral flange of the overhanging portion of the top cover of one busway section;

B. a second electrically conductive foil having a first portion wrapped in electrical connection with a termination of said second ground busbar and a second portion wrapped over the lateral flange of the overhanging portion of the bottom cover of the other busway section, (1) whereby, upon joining the busway sections end-to-end, the second portions of the first and second foils are in electrical contacting interengagement sandwiched between the lapped flanges of the overhanging portions of the top and bottom busway section covers; and C. a fastener clamping the lapped flanges of the overhanging top and bottom cover portions together to exert joint clamping pressure on said electrical contacting second portions of said first and second foils.

2. The electrical joint defined in claim 1, wherein said fastener extends through registered holes in the lapped flanges and the second portions of said first and second foils.

3. The electrical joint defined in claim 2, wherein said first and second foils are each formed of copper approximately 20 mils thick.

4. The electrical joint defined in claim 1, wherein the first portions of said first and second foils are respectfully riveted to the terminations of said first and second ground busbars.

5. The electrical joint defined in claim 4, wherein said fastener extends through registered holes in the lapped flanges and the second portions of said first and second foils.

6. The electrical joint defined in claim 5, wherein said first and second foils are each formed of copper approximately 20 mils thick.

* * * * *